US006315403B1

(12) United States Patent
Shinozaki

(10) Patent No.: US 6,315,403 B1
(45) Date of Patent: Nov. 13, 2001

(54) RECORDING APPARATUS AND METHOD

(75) Inventor: Kenji Shinozaki, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/433,214

(22) Filed: Nov. 4, 1999

(30) Foreign Application Priority Data

Nov. 12, 1998 (JP) ........................ 10-322361

(51) Int. Cl.[7] ........................ G01D 11/00
(52) U.S. Cl. ........................ 347/100; 347/56
(58) Field of Search ........................ 347/100, 46, 56, 347/61

(56) References Cited

FOREIGN PATENT DOCUMENTS

11291639 * 10/1999 (JP) .
11320932 * 11/1999 (JP) .

OTHER PUBLICATIONS

On the theory of thermocapillary, or Marangoni, convection in the capillary water on paper fiber, TAPPI Journal, 73, No. 4, pp. 209–212, 4/90, Lehtinen J.*

* cited by examiner

*Primary Examiner*—Huan Tran
*Assistant Examiner*—Shih-wen Hsieh

(57) ABSTRACT

An ink retained in an ink transfer block is heated by a heating device correspondingly to information to be printed, thereby developing a surface tension gradient and interfacial tension gradient on the ink surface, and a fluidity caused by the surface tension gradient and/or interfacial tension gradient of the ink surface is utilized to have the ink fly from the ink transfer block, thereby printing the information on a print receptor, the heating device having a heating velocity v (in K/s) which meets a requirement $(T_b-T_i)/v>h^2/D$ where $T_b$ is a boiling point of the ink in K; $T_i$ is an initial temperature of the ink in K; h is the shortest distance between the surface of the heating means and ink surface in m; and D is a coefficient of thermal diffusion in $m^2/s$.

6 Claims, 6 Drawing Sheets

RECORDING APPARATUS AND METHOD

BACKGROUND OF THE INVENTION

1. Field of the Invention

The present invention relates to a thermal transfer type recording apparatus and method, capable of recording an image in a continuous gradation.

2. Description of the Related Art

Along with the recent advanced technology of recording in colors data from the video camera, computer graphic data, etc., the demands for recording in a single color as well as for hard copying in colors have become greater. To accommodate such demands, color hard copying techniques such as the sublimation type thermal printing, fusion type thermal printing, ink-jet printing, electrophotographic printing, heat development type silver film image printing, etc. have been proposed. Among these printing techniques, the dye diffusion thermal printing technique (sublimation type thermal printing) and ink-jet printing technique can be implemented by a simple apparatus to easily provide quality images.

Of these recording techniques, the dye fusion thermal printing technique is such that an ink ribbon or ink sheet having coated thereon an ink layer of a suitable binder resin in which a transferrable dye of a high concentration is dispersed, and a print receptor coated thereon with a dyeing resin to accept the transferred dye, such as a printing paper, are put into close contact with each other under a predetermined pressure, a heat corresponding to image information is imparted to the ink sheet from a thermo-sensitive printer head on the ink sheet, and thus the transferred dye is thermally printed from the ink sheet to the print receptor correspondingly to the heat quantity impaired from the dyeing resin layer.

The above operations are repeated for each of image signals decomposed into three subtractive primaries: yellow, magenta and cyan, thereby providing a full color image having a continuous gradation. This is a so-called dye decomposition thermal transfer type printing technique which permits to implement a recording apparatus designed compact, easy to maintain, ready to start up for printing and capable of providing an image having a quality as high as that assured by the silver film image color photography.

However, this technique is not advantageous in that the disposable ink sheet will result in a big waste and the running cost is large. Thus, the technique has not being prevailing. This is also true with the fusion type thermal transfer type printing technique.

The conventional thermal transfer type printing provides quality images but the dedicated printing paper and disposable ink ribbon or ink sheet lead to a high running cost.

On the other hand, the ink-jet printing technique is such that as disclosed in the Japanese Unexamined Patent Publication Nos. 86-59911 and 93-217, a small droplets of printing ink are jetted from a nozzle provided in a printer head to the surface of a printing material by one of the electrostatic attractive force technique, continuous vibration (piezo) technique, thermal printing (bubble-jet) technique, etc. selected correspondingly to image information to be printed and the printing ink adheres to the printing material, thereby forming an image on the printing material.

Therefore, printing can be made on a plain paper and the running cost is low with little waste resulted from the disposable ink ribbon. Recently, since the thermal (bubble-jet) recording method permits to easily provide a color image, so it is prevailing.

Because of the principle, however, the ink-jet printing technique can hardly print an image with an intra-pixel density gradation, and thus reproduce in a short time a quality image having a quality as high as that of a silver film image obtainable using the dye diffusion type thermal printing method.

That is, since one droplet of ink forms one pixel, the conventional ink-jet printing technique is hard to print an image with an intra-pixel gradation and cannot form an image having a high quality. It has been tried to utilize the high resolution of the ink-jet printing for representation of a pseudo gradation by the dither method. However, this approach cannot assure the same image quality as that in the sublimation thermal printing and the printing speed is considerably lower than that in the sublimation thermal printing.

To solve the above-mentioned problems encountered with in the field of the prior art, it has been proposed to use a so-called mist of ink in the ink-jet printing in order to micronize the ink droplet to be jetted. This technique generally includes two methods: one is the ultrasonic vibration method and the other is the satellite droplet method. In the ultrasonic vibration method, an ultrasonic vibration is generated at an ink nozzle using mainly a piezo transducer to develop a surface tension vibration under which the ink droplets collide with each other to produce an ink mist which is to be jetted towards, and thus to adhere to, the surface of a printing material. On the other hand, the satellite droplet method is such that micro droplets of ink generated derivatively just after generation of main droplets of ink are utilized to form an image on the printing material but the main droplets of ink are not used for the image forming.

Generally, it is difficult to microstructure the piezo element. So, the ultrasonic vibration method is disadvantageous in that no line printer head can be built and thus no high printing speed can be attained. Also it is difficult to localize the ultrasonic vibration, and thus the microstructuring of the piezo element is further difficult and the cross-talk is a large problem in the ultrasonic vibration method. To prevent the main droplets of ink from being transferred to the printing paper, the satellite droplet method needs, for example, a suitable means for charging the droplet and deflecting it in an electric field. This method is actually limited to the so-called continuous ink-jet printing technique and so cannot be implemented with a low cost.

To solve the above problems, an ink mist printing technique has recently been proposed.

More specifically, the ink mist printing method utilizes the collision of ink droplets due to a surface tension convection developed as a heater is energized and deenergized, to atomize an ink for transfer to thereby form a quality image. In this method, the well-known semiconductor machining technique can be used to easily dispose heaters highly densely and an appropriate structure can be placed on the heaters to avoid the problems such as cross-talk, etc.

In this method, however, when the printing liquid or ink is heated by the heaters, the ink boiling causes coarse droplets and micro droplets derivatively produced along with main droplets, so-called satellite droplets, which will cause the printing quality to be lower. Namely, it is difficult to stably jet an ink mist by the surface tension convection.

OBJECT AND SUMMARY OF THE INVENTION

Accordingly, the present invention has an object to overcome the above-mentioned drawbacks of the prior art by providing a recording apparatus and method capable of stably jetting ink mists by the surface tension convection.

The above object can be attained by providing a recording apparatus in which an ink retained in an ink transfer block is heated by a heating means correspondingly to information to be printed, thereby developing a surface tension gradient and interfacial tension gradient on the ink surface, and a fluidity caused by the surface tension gradient and/or interfacial tension gradient of the ink surface is utilized to have the ink fly from the ink transfer block, thereby printing the information on a print receptor, the heating means having a heating velocity v (in K/s) which meets the following:

$$(T_b-T_i)/v>h^2/D$$

where $T_b$: Boiling point of the ink in K $T_i$: Initial temperature of the ink in K h: Shortest distance between the surface of the heating means and ink surface in m D: Coefficient of thermal diffusion in $m^2/s$.

In the above recording apparatus, since the heating velocity v of the heating means meets the relation $(T_b-T_i)/v>h^2/D$, the heat is transmitted from the heating means to the ink surface before the temperature on the surface of the heating means reaches the boiling point of the ink and the surface tension gradient and/or interfacial tension gradient allows the ink to flow before the ink arrives at its boiling point.

Also, the above object can be attained by providing a recording method in which an ink retained in an ink transfer block is heated by a heating means correspondingly to information to be printed, thereby developing a surface tension gradient and/or interfacial tension gradient on the ink surface, and a fluidity caused by the surface tension gradient and/or interfacial tension gradient on the ink surface is utilized to have the ink fly from the ink transfer block, thereby printing the information on a print receptor, the heating means having a heating velocity v (in K/s) which meets the following:

$$(T_b-T_i)/v>h^2/D$$

where $T_b$: Boiling point of the ink in K $T_i$: Initial temperature of the ink in K h: Shortest distance between the surface of the heating means and ink surface in m D: Coefficient of thermal diffusion in $m^2/s$.

In the above recording method, since the heating velocity v of the heating means meets the relation $(T_b-T_i)/v>h^2/D$, the heat is transmitted from the heating means to the ink surface before the temperature on the surface of the heating means reaches the boiling point of the ink and the surface tension gradient and/or interfacial tension gradient allows the ink to flow before the ink arrives at its boiling point.

These objects and other objects, features and advantages of the present intention will become more apparent from the following detailed description of the preferred embodiments of the present invention when taken in conjunction with the accompanying drawings.

DETAILED DESCRIPTION OF THE PREFERRED EMBODIMENTS (1) Printer head

Figure 1:
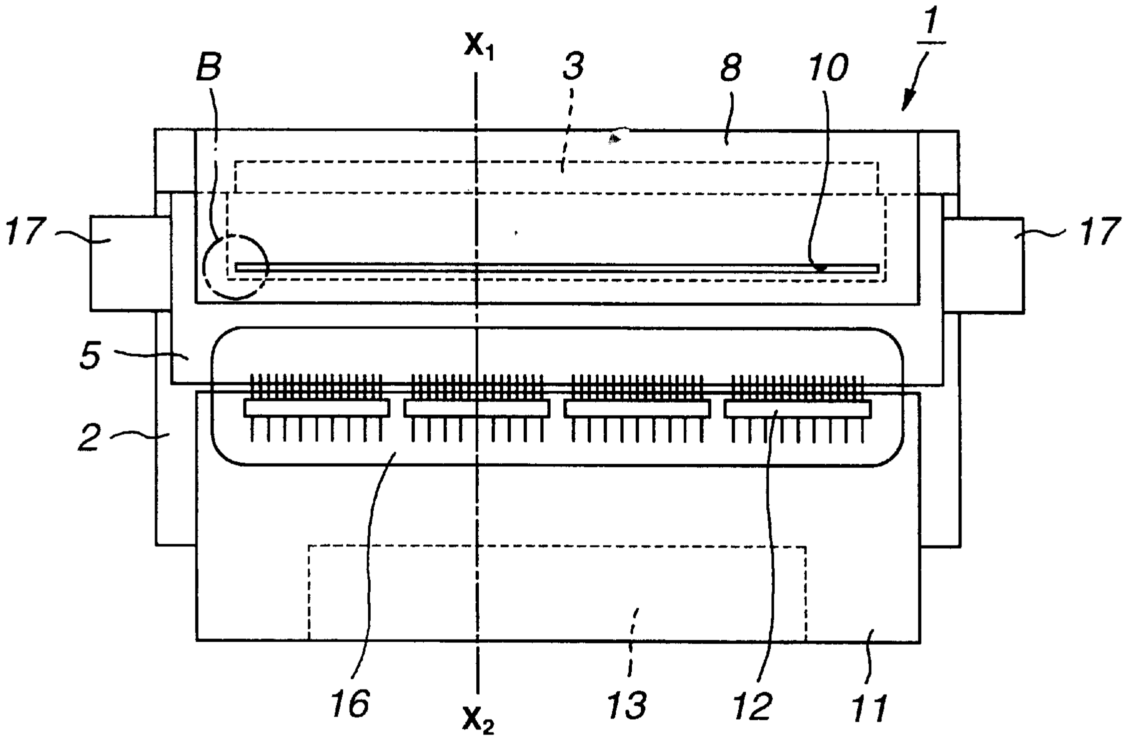
FIG. 1 is a plan view of an embodiment of printer head according to the present invention, schematically illustrating the construction of the printer head.
Figure 2:
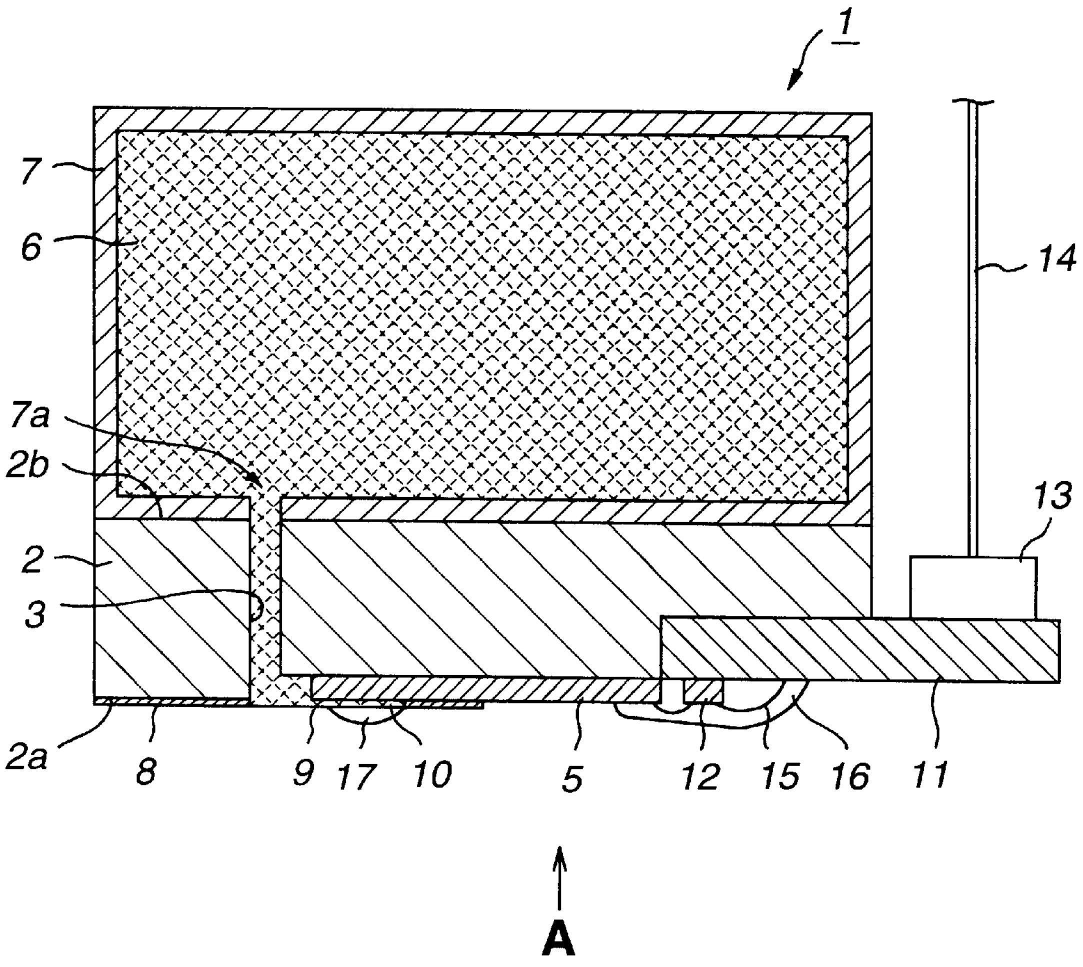
FIG. 2 is a sectional view of the printer head, taken along the line $X_1$–$X_2$ in FIG. 1.

First the embodiment of a printer head used in the recording apparatus according to the present invention will be described below:

FIG. 1 is a schematic plan view of the printer head of the recording apparatus according to the present invention, showing the construction of the printer head viewed from a surface to which data is transferred (print receptor). FIG. 2 is a sectional view of the printer head, taken along the line $X_1$–$X_2$ in FIG. 1. Namely, FIG. 1 provides a view of the printer head from the arrow A in FIG. 1. In FIGS. 1 and 2, the printer head is generally indicated with a reference 1.

As shown in FIGS. 1 and 2, the printer head 1 is provided with a head base 2 made of an aluminum plate, for example. The head base 2 serves as the base for the printer head 1 and also as a heat sink. The head base 2 has formed through it an ink supply hole 3 extending from one main surface 2*a* and other main surface 2*b* of the head base 2.

A heater chip 5 having an ink transfer block 4 is attached to the one main surface 2*a* of the head base 2 with a heat conductive adhesive, for example. There is installed on the other main surface 2*b* of the head base 2 an ink reservoir 7 made of stainless steel and in which an ink 6 is filled. The ink reservoir 7 has formed through the side thereof joined to the other main surface 2*b* of the head base 2 an opening 7*a* nearly equal in diameter to the ink supply hole 3. The ink reservoir 7 is installed to the other main surface 2*b* of the head base 2 in such a manner that the opening 7*a* communicates with the ink supply hole 3 and the ink 6 in the ink reservoir 7 is supplied to the ink supply hole 3 through the opening 7*a*.

Also, a nickel sheet 8 is attached over the heater chip 5 and a portion of the one main surface 2*a* of the head base 2 and on which the heater chip 5 does not extends. An ink supply path 9 communicating with the ink supply hole 3 is defined between the nickel sheet 8, head base 2 and heater chip 5. The nickel sheet 8 has a slit 10 formed therein. The nickel sheet 8 is attached over the heater chip 5 and a portion of the one main surface 2*a* of the head base 2 and on which the heater chip 5 does not extends, in such a manner that the slit 10 is positioned over the ink transfer block 4 of the heater chip 5.

Also, there is attached a printed wiring board 11 on the one main surface 2*a* of the head base 2 in an area adjacent to the area where the heat chip 5 is attached. The printed wiring board 11 has a driver IC 12 mounted thereon to drive a heater provided in the heater chip 5 according to a drive signal corresponding to an image data. As shown, the portion of the head base 2 where the printed wiring board 11 is attached is made slightly thinner than the portion where the heater chip 5 is attached, so that with the printed wiring board 11 attached to the head base 2, the driver IC 12 mounted on the printed wiring board 11 comes to nearly the same height as the heater chip 5 on the head base 2.

The printed wiring board 11 is connected to a drive controller (not shown) by a connector 13 and flat cable 14.

A drive signal and power from the drive controller are supplied to the driver IC 12 through the flat cable 14, connector 13 and wires in the printed wiring board 11, and finally to electrodes on the heater chip 5 connected to the driver IC 12 by interconnecting conductors 15 made of gold, for example.

Also, connections between the electrodes on the heater ship 5 and driver IC 12, and connections between the driver IC 12 and wires in the printed wiring board 11, are applied each with a protective material 16 using a silicone coating material JCR (junction coating resin), for example, to protect the interconnecting conductors 15 connecting the electrodes to the driver IC 12 and driver IC 12 to the wires in the printed wiring board 11. The JCR is heat-cured.

The head base 2 has installed to each of the right and left lateral sides thereof a spacer 17 to keep an appropriate gap between the ink transfer block 4 of the heater chip 5 and the surface of an intermediate transfer member which will further be described. The spacer 17 has a tip thereof formed from Teflon, for example. The spacer 17 is installed to each of the right and left lateral sides of the head base 2 as mentioned above in such a manner that the tip thereof projections in the direction of thickness from the ink transfer block 4 of the heater chip 5 and abuts the surface of the intermediate transfer member, thereby keeping the appropriate gap between the ink transfer block 4 and the surface of the intermediate transfer member.

The printer head 1 constructed as mentioned above is about 26 mm wide, about 22 mm deep and about 18 mm high, and the ink reservoir 7 is designed to have a capacity of 5 cc or so, for example.

Figure 3:
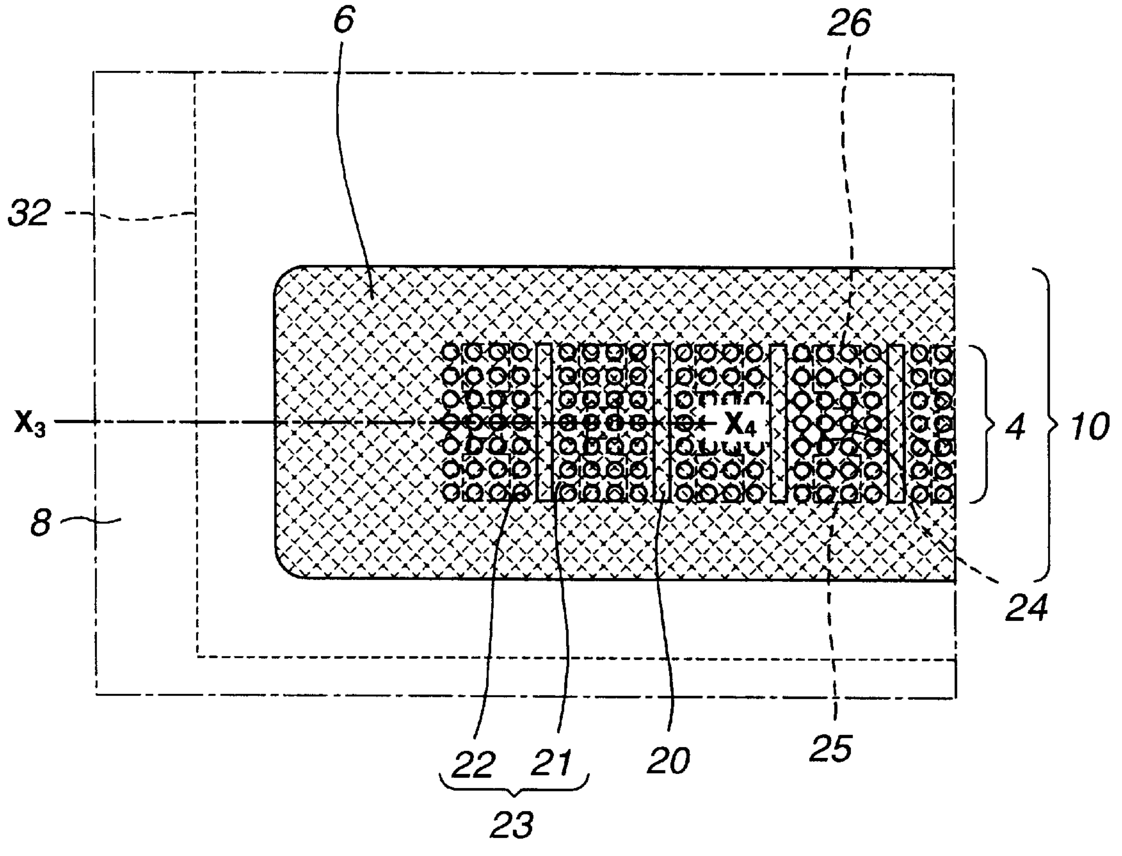
FIG. 3 is a plan view, enlarged in scale, of a portion, enclosed in a circle B, near an ink transfer block of the printer head in FIG. 1.
Figure 4:
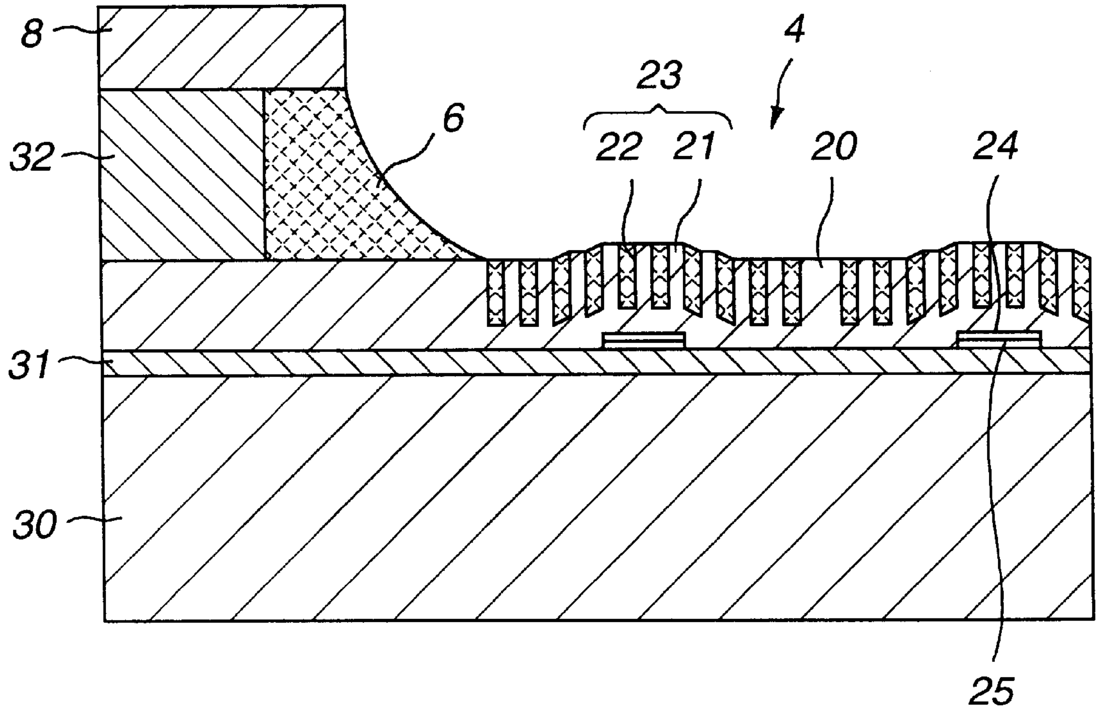
FIG. 4 is a sectional view, enlarged in scale, of a portion of the printer head near an ink retainer of the ink transfer block, taken along the line $X_3$–$X_4$ in FIG. 3.

The heater chip 5 has provided thereon a plurality of ink transfer blocks 4 adjacent to each other. FIG. 3 is a plan view, enlarged in scale, of a portion, enclosed in a circle B, near the ink retainer of the ink transfer block 4 in the printer head 5 in FIG. 1. FIG. 4 is a sectional view, enlarged in scale, of a portion near the ink retainer of the ink transfer block 4 in the printer head 5, taken along the line $X_3$–$X_4$ in FIG. 3.

As shown in FIGS. 3 and 4, the plurality of ink transfer blocks 4 adjacent to each other is separated into individual ink transfer blocks 4 by partition walls 20 of about 6 μm in height and made of $SiO_2$, for example. Each of the ink transfer blocks 4 consists of at least four projections 21 formed integrally with the partition wall 20 from the same material. The projections 21 are formed each like a square pole of about 6 μm in height and having a square section whose each side is about 3 μm long, and disposed in the form of a grid in each ink transfer block 4 for the center distance to be about 6 μm, for example.

In this heater chip 5, the ink 6 supplied to the ink transfer block 4 is retain under the action of capillarity of the rugged structure composed of the plurality of projections 21 and concave spaces 22 defined between the neighboring projections 4. That is, the rugged structure forms an ink retainer 23 in the ink transfer block 4.

Note that the shape of the projections 21 in the rugged structure is not limited to the square pole but should preferably be columnar, conical or truncated-conical having a polygonal section as in a circle, ellipse, triangle or square in order to effectively have the rugged structure provide the capillarity.

The projections 21 in the rugged structure should desirably have a height range 1 to 50 μm, width range of 1 to 10 μm and center distance range of 2 to 40 μm and be disposed in each ink transfer block 4. If the projection 21 is lower than 1 μm, the capillarity is smaller and the ink 6 is retained in a reduced amount, and the efficiency of transferring the ink 6 is lower. On the contrary, if the projection 21 is higher than 50 μm, the heat transfer to the surface of the ink 6 is slower and thus the efficiency of transferring the ink 6 is lower. If the projection 21 is narrower than 1 μm, it will be weaker so that it may possibly be damaged while transferring or retaining the ink 6 and thus no stable fly of the ink 6 can possibly be assured. On the contrary, if the projection 21 is wider than 10 μm or if the center distance of the projections 21 is smaller than 2 μm, the surface area of the ink 6 at its level is smaller and thus the efficiency of transferring the ink 6 is lower. Also, if the center distance of the projections 21 exceeds 40 μm, no sufficient capillarity can be provided. Therefore, the projections 21 should preferably have a height range of 2 to 10 μm, width range of 2 to 5 μm and center distance range of 3 to 10 μm.

If the projections 21 are disposed in each ink transfer block 4 to effectively provide a capillarity, they may be disposed regularly or irregularly.

Each of the ink transfer blocks 4 comprises a heater 24 provided below the ink retainer 23 formed from the rugged structure to heat the ink retained in the ink retainer 23. The heater 24 is a nearly square plate of a polysilicone, for example, whose each side is about 20 μm long. These heaters 24 are connected to individual electrodes 25 and common electrodes 26, respectively, each made of aluminum, for example.

To make the heater chip 5 having the ink transfer blocks 4, first a silicone substrate 30 of about 650 μm in thickness is prepared as a base, and a heat insulation layer 31 of $SiO_2$ or the like is formed on the silicone substrate 30. Using the lithography technique used in the semiconductor device manufacturing process, there are formed the individual electrodes 25, common electrodes 26 and heaters 24 on the heat insulation layer 31 for each of the ink transfer blocks 4. More specifically, 256 pieces of the heater 24 are disposed at a pitch of 84.7 μm (300 DPI) per heater chip 5. Therefore, this embodiment of the printer head 1 can print over a width of 21.7 mm at a time.

Also, using the lithography technique, there is formed a rugged structure (ink retainer 23) of $SiO_2$ or the like on the heat insulation layer 31 on which the individual electrodes 25, common electrodes 26 and heaters 24 are formed. Here the heater chip 5 having the ink transfer blocks 4 is finished. The details of the manufacturing process for the heater chip 5 is referred to the Japanese Unexamined Patent Publication No. 183235-97.

It should be noted that in addition to the above-mentioned lithography technique used in the semiconductor device manufacturing process, the methods of making the rugged structure may include, for example, embossing, photoetching using a photosensitive resin, wet etching using a photosensitive resin as a mask, electroplating in which electrochemical reaction is applied, etc. Among others, the electroplating can conveniently be used to form the rugged structure without effecting the process of forming the $SiO_2$ layer, which will take a relatively long time, the process of forming a metal mask and the process of etching the $SiO_2$ layer. Therefore, the electroplating can effectively be used to form the rugged structure in a considerably shorter time than that required for forming the rugged structure from $SiO_2$. Thus, the processing time can be reduced to improve the mass productivity and reduce the manufacturing cost.

In the foregoing, the present invention has been described concerning an embodiment of the ink retainer 23 formed from the rugged structure. However, the present invention is not limited to this embodiment, but the ink retainer 23 may be constructed from any other structure formed from an aggregate of beads or fibers and which would be able to work similarly to the aforementioned rugged structure.

The heater chip 5 made as in the above is joined to the one main surface 2*a* of the head base 2. Further, a dry film 32 having a thickness of about 50 μm for example is attached to the heater chip 5 joined to the one main surface 2*a* of the head base 2, and patterned for the ink transfer blocks 4 to be exposed. The aforementioned nickel sheet 8 is joined by thermocompression bonding to the heater chip 5 to which the dry film 32 is attached. At this time, the nickel sheet 8 is joined to the heater chip 5 with the dry film 32 on the heater chip 5 in such manner that the center of the slit 10 coincides with that of the heater 24 provided on the heater chip 5. Thus, the ink transfer blocks 4 on the heater chip 5 faces the outer surface of the printer head 1 through the slit 10 in the nickel sheet 8.

The ink 6 supplied to the ink transfer block 4 through the ink supply hole 3 and ink supply path 9 stably forms a meniscus along the slit 10 in the nickel sheet 8. The ink 6 supplied to the ink transfer block 4 is retained in the ink retainer 23 under the action of the capillarity of the rugged structure. The ink 6 retained in the ink retainer 23 is heated by the heater 24 driven according to the drive signal corresponding to an image data to develop on the surface thereof a surface tension gradient and/or interfacial tension gradient. Owing to the surface tension gradient and/or interfacial tension gradient, the ink 6 is fluidized in the ink transfer blocks 4 and the flows of the ink 6 collide with the projections 21 of the ink retainer 23 or collide with each other. Thus a part of the ink 6 flies out of the printer head 1 through the slit 10 in the nickel sheet 8 as ink mists having a diameter of 10 μm or less including ink steam.

In the foregoing, the present invention has been described concerning an embodiment in which the heater 24 driven according to a drive signal is provided below the ink retainer 23 and the ink 6 retained in the ink retainer 23 is heated by the heater 24. This is a so-called resistance heating. However, the heating of the ink 6 in the present invention is not limited to this resistance heating but the ink 6 may be heated by any other heating method than the resistance heating, which would be able to heat the ink 6 by a frequency of less than 1 kHz.

More particularly, the ink 6 may be heated by a microwave heating. For this microwave heating, a microwave absorber is provided in a part of the ink transfer block 4 or in a part of the ink 6 retained in the ink retainer 23 and irradiated with a microwave from outside the printer head 1 to heat the ink 6.

For this microwave heating of the ink 6, a part of the ink transfer block 4 or a part of the ink retainer 23 may be formed from a material in which a laser light energy is converted to a heat, and a laser light be focused on the light-heat converting material to generate a heat. In this case, all types of laser such as gas laser, eximer laser, solid laser, etc. can be used as a laser source. A laser source having a small size and consuming less power to heat the ink 6 can be made from a semiconductor laser. For heating the ink 6 by the laser light, use of a transparent substrate formed from a quartz glass as the base for the heater chip 5 in place of the silicone substrate 30 permits to dispose the laser source at an opposite side to the side of the heater chip 5 where the ink 6 is jetted. Thus, the laser light can be irradiated from the laser source at the opposite side to the side of the heater chip 5 where the ink 6 is jetted. Namely, the printer head 1 can be designed more freely.

The printer head 1 having been described in the foregoing is used by connecting the wires in the printed wiring board 11 to an FPC (flexible printed circuit) (not shown) via the connector for either serial or line printing.

Figure 5:
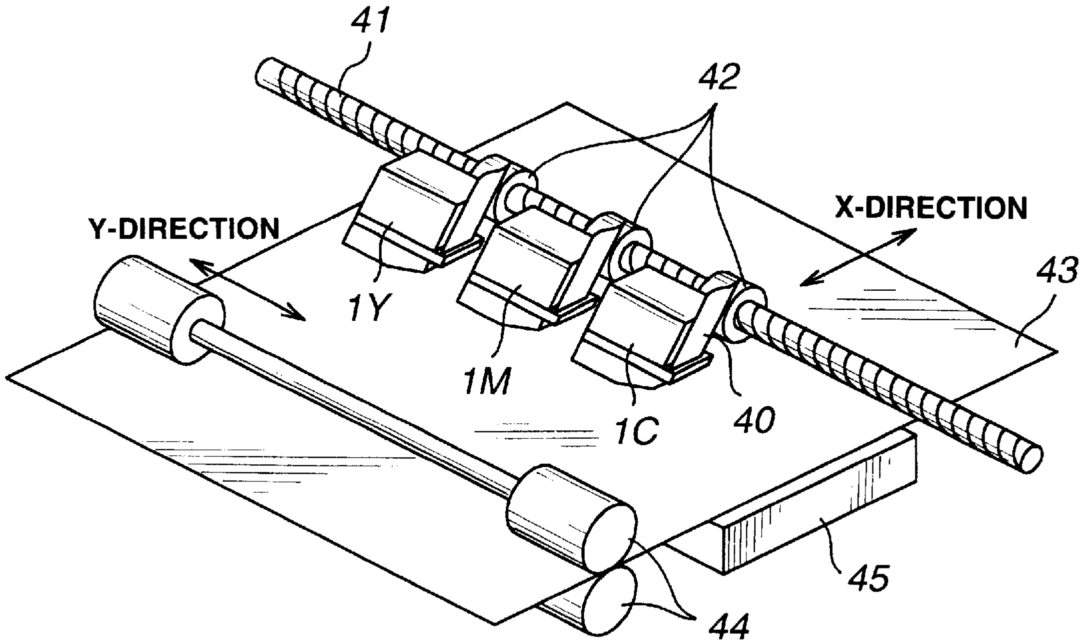
FIG. 5 is a perspective view of a printer to which the printer heads are disposed for serial printing.

When the serial printing is adopted, three printer heads 1Y, 1M and 1C in which inks of three primary colors, yellow (Y), magenta (M) and cyan (C), are filled, respectively, are disposed in parallel in a Y-direction (lateral) as in FIG. 5. These printer heads 1Y, 1M and 1C are coupled by coupling members 40 to moving pieces 42, respectively, engaged on a head feed shaft 41. One end of the head base 2 at the side thereof where the heater chip 5 is provided is put in contact with a print receptor 43 to which the inks are transferred so that the printer heads 1Y, 1M and 1C can be held at a predetermined angle in relation to the print receptor 43. Thus, a constant space can be maintained between the center of the ink transfer block 4 and the print receptor 43.

The head feed shaft 41 is freely rotatable by a motor (not shown) according to image information to be printed out. Since the moving pieces 42 of the printer heads 1Y, 1M and 1C are screwed on the head feed shaft 41, as the head feed shaft 41 rotates, each of the printer heads 1Y, 1M and 1C is scanned in the Y-direction in FIG. 5.

Further, in this serial printer, there are provided feed rollers 44 which are rotatable to move the ink-transferred ink in an X-direction (longitudinal) in FIG. 5. Thus, the longitudinal movement of the print receptor and lateral scanning of the printer heads 1Y, 1M and 1C are effected alternately.

On the other hand, the print receptor 43 disposed face to face with the printer heads 1Y, 1M and 1C is moved in the Y-direction in FIG. 5 by the feed rollers 44 at each one line scanning of the printer heads 1Y, 1M and 1C. In addition, a platen 45 is provided in the printer. Thus, the print receptor 43 located between the platen 45 and printer heads 1Y, 1M and 1C receives inks jetted from the printer heads 1Y, 1M and 1C.

As having previously been described, each of the printer heads 1Y, 1M and 1C has 256 heaters. When the printer heads 1Y, 1M and 1C are scanned once, the feed rollers 44 also serving to support the heads moves the print receptor 43 for 256 lines over the platen 45 and each of the printer heads 1Y, 1M and 1C can start jetting the ink at such a different time from those for the other two printer heads that the printer head starts printing at a predetermined position on the print receptor 43. Thus, a color image can be printed by a single scamming of the printer heads 1Y, 1M and 1C.

Note that a black ink may be used in addition to the inks of thee primary colors, yellow, magenta and cyan.

Figure 6:
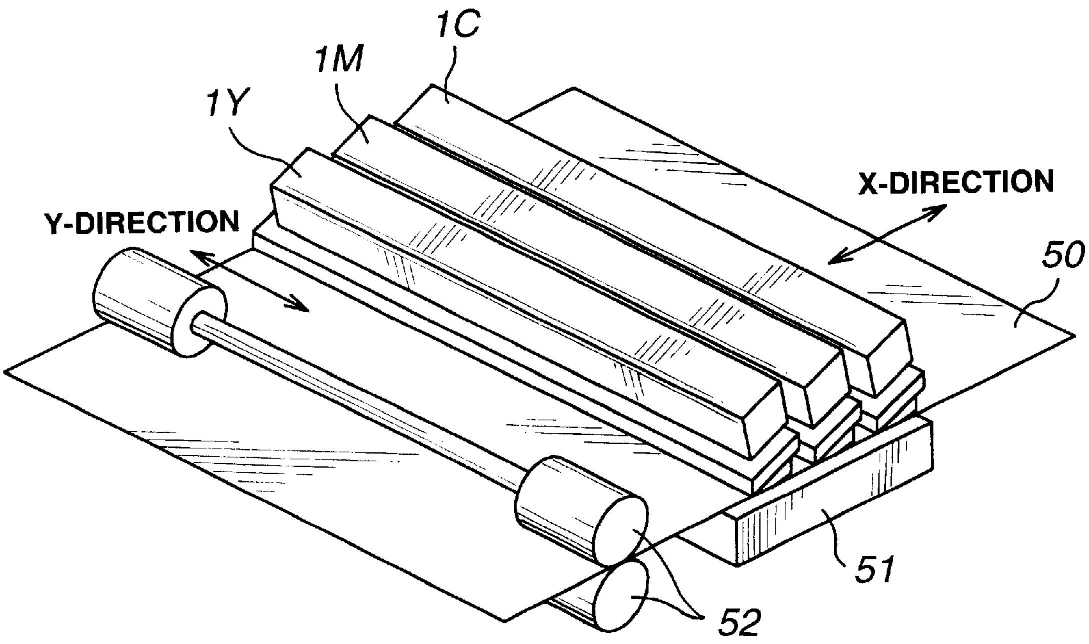
FIG. 6 is a perspective view of the printer to which the printer heads are disposed for line printing.

When the line printing is selected, printer heads 1Y, 1M and 1C for the yellow, magenta and cyan inks, respectively, are designed to accommodate the width of a print receptor 50 as shown in FIG. 6, and disposed in an X-direction (longitudinal) as in FIG. 6.

The print receptor 50 is disposed opposite face to face with the printer heads 1Y, 1M and 1C and between these printer heads and a platen 51. The print receptor 50 is moved by feed rollers 52 in the X-direction in FIG. 6 while receiving inks from the printer heads 1Y, 1M and 1C. It should be noted that also in this embodiment, a black ink may be used in addition to the yellow, magenta and cyan inks.

For printing using the printer head 1 constructed as described in the above, a drive signal and power are supplied to the driver IC 12 from a drive controller (not shown) through the flat cable 14, connector 13 and wires of the printed wiring board 11. The drive signal and power supplied to the driver IC 12 are further supplied to the electrodes on the heater chip 5 via the interconnecting conductors 15 made of gold or the like. The heater 24 is driven by the power supplied to the electrodes according to the drive signal to heat the ink 6 retained in the ink retainer 23. Heating of the ink 6 by the heater 24 develops on the surface of the ink 6 a surface tension gradient and/or interfacial tension gradient, which allow the ink 6 to flow and fly for transfer to the print receptor on which data will thus be recorded.

At this time, if the ink 6 is heated to boil by the heater 24, the ink 6 will oscillate greatly and result in coarse droplets, micro droplets derivatively caused from the main droplets, namely, so-called satellite droplets. They will possibly cause to make unstable the ink flow due to the surface tension gradient and/or interfacial tension gradient which drive the ink 6 in this embodiment, that is, the so-called Marangoni convection.

Therefore, to develop a stable Marangoni convection based on the surface tension gradient and/or interfacial tension gradient, the Marangoni convection should be caused to take place before the ink 6 arrives at its boiling point.

So, in the printer head 1 according to the present invention, the heating velocity of the heater 24 is set so that the time required for the heat from the heater 24 to transfer to the surface of the ink 6 is shorter than the time for the surface temperature of the heater 24 to reach the boiling point of the ink 6.

More specifically, on the assumption that the heating velocity of the heater 24 is v [K/s], boiling point of the ink 6 is $T_b$ [K], initial temperature of the ink 6 is $T_i$ [K], shortest distance from the surface of the heater 24 to that of the ink 6 is h [m] and the coefficient of thermodiffusion of the ink 6 is D [$m^2$/s], the heating velocity v of the heater 24 should meet the following requirement:

$$(T_b-T_i)/v>h^2/D \tag{1}$$

The right side of the expression (1) indicates a time for the heat to transfer from the surface of the heater 24 to that of the ink 6. The left side indicates a time for the temperature of the ink 6 on the heater 24 to reach the boiling point. When the former is smaller than the latter, the Marangoni convection can be developed before the ink 6 arrives at its boiling point.

The coefficient of thermodiffusion D is a coefficient defined by the thermodiffusion equation expressed as follows:

$$T/t=D^2T/x^2 \tag{2}$$

Since the ink 6 is heated by energizing the heater 24, on the assumption that the power supplied to the heater 24 is p (W), specific heat of the heater 24 is $C_h$ (J/kg) and the weight of the beater 24 is $m_h$, the heating velocity v can be given as follows:

$$v=(C_h m_h)/p \tag{3}$$

Actually, however, the heater 24 is formed on a thin film of $SiO_2$, for example, formed on the silicone substrate 30 and has the upper surface thereof covered with a protective layer. Further, the heater 24 is in contact with the ink 6. Therefore, since the energy supplied to the heater 24 escapes by diffusion to these portions adjacent to the heater 24, the real heating velocity v of the heater 24 is lower than the one expected by the expression (3). Namely, when the real heating velocity is $v_{real}$, $v_{real}<v$. Thus, it is evident that the requirement is met even when $v=V_{real}$. Actually, if the power p is sufficiently large, the difference between v and $v_{real}$ is negligibly small.

Even if the heating velocity v of the heater 24 meets the requirement in (1), there is a fear that the temperature of the ink 6 on the surface of the heater 24 may eventually reach the boiling point if the heating is continuously done. Actually, however, the ink temperature will not reach the boiling point. This is because once the ink 6 having been heated starts being discharged, the ink 6 at a lower temperature will be supplied to the heater 24 accordingly.

Generally, as the printing is continuously done, the initial temperature $T_i$ of the ink 6 is elevated due to the effect of heat storage and the initial temperature $T_i$ may possibly rise up to the boiling point $T_b$ in an extreme case. Of course, however, the heat radiating condition has to be set for the printer head so that the initial temperature $T_i$ will not rise up to the boiling point $T_b$. This setting can easily be attained using the conventional technique well known to those skilled in the art.

Since the heater temperature selection velocity is set as in the above in the printer head according to the present invention, the surface tension convention can be developed without being influenced by the boiling of the ink, whereby a quality image can be printed.

(2) Ink

Next, the ink 6 used in the recording apparatus according to the present invention will be described below:

The ink 6 used in the recording apparatus according to the present invention is composed of a dye, solvent and an additive added as necessary. For the ink 6, such materials are selected and mixed in a ratio to optimize the transfer sensitivity, thermal stability, print quality, storage stability, etc. The ink 6 is instantaneously heated up to a high temperature above 200° C. by a heating means such as the heater 24. Therefore, when the thermal decomposition temperature of the components such as the dye, solvent, etc. is under 200° C., the components are partially decomposed and the decomposition products are accumulated in the ink transfer block 4, possibly blocking the stable flying of the ink 6. Thus, the ink 6 used in the recording apparatus should desirably be composed of a dye, solvent and additive of which the thermal decomposition temperatures are higher than 200° C. More particularly, the ink 6 should desirably be composed of a dye, solvent and additive which are thermally decomposed in an amount of less than 100 when the ink 6 is heated at 200° C. for one hour in the atmosphere.

The dye for the ink 6 may be any one which meets the above heat-resistance requirement, is sufficiently soluble in a solvent and is more or less stable in storage on the printing paper, and it should preferably be a low-polarity, oil-soluble dye called "dispersed dye" or "oil-soluble dye". Also, the dye should preferably be used after subjected to a sublimation refinement, recrystallization, zone melting or column refinement. By refining the dye, it is possible to reduce the evaporated residue and prevent thermal decomposition product from adhering to the ink transfer block 4.

The solvent for the ink 6 should be any one which meets the above-mentioned heat-resistance requirement, has a melting point lower than 50° C., a boiling point higher than 250° C., a high compatibility with the above-mentioned dye, a coefficient of viscosity higher than 100 cps at 100° C., a low influence on the human body, and has no color. More specifically, the solvent for the ink 6 should preferably be a one selected from organic compounds generally called plasticizer, such as phthalic ester, sebacic ester, phosphoric ester, etc. or organic compounds in which an aromatic ring and alkyl chain are combined, such as ethyl naphthalene, propyl naphthalene, hexyl naphthalene, octyl benzene, etc.

The ink 6 is prepared by solving in the above solvent the above dye in 5% by weight or more, preferably 10% by weight or more, or more preferably 20% by weight or more at a temperature lower than 50° C. To improve the solubility of the dye in the solvent, two or more kinds of dye may be mixed. Also, a mixture of more than two kinds of solvent may be used. Further, to adjust the physical properties of the ink 6, additives such as a surfactant, viscosity conditioner or the like may be added in appropriate amounts, respectively, to the mixture of the dye and solvent to prepare the ink 6.

The ink 6 thus prepared is filled in the ink reservoir 7 of the printer head 1. More specifically, Solvent Yellow 56 refined by sublimation is solved in 10% by weight in dibutyl phthalate to prepare a yellow ink, Disperse Red-1 refined by sublimation is solved in 10% by weight in dibutyl phthalate to prepare a magenta ink, and Solvent Blue-35 refined by sublimation is solved in 15% by weight in dibutyl phthalate to prepare a cyan ink. The yellow and magenta and cyan inks are filled in the ink reservoirs 7, respectively, of the printer heads 1Y, 1M and 1C, respectively.

The ink 6 filled in the ink reservoir 7 is supplied to the ink transfer block 4 of the heater chip 5 through the opening 7*a* of the ink reservoir 7, ink supply hole 3 formed in the head base 2, and the ink supply path 9 defined by the nickel sheet 8 an, head base 2 and heater chip 5. The ink 6 supplied to the ink transfer block 4 forms an appropriate meniscus along the slit 10 formed in the nickel sheet 8 and retained in the ink retainer 23 under the action of capillarity of the ink retainer 23 having the rugged structure.

The ink 6 retained in the ink retainer 23 becomes nearly as high as the projections 21 forming the ink retainer 23. It will be about 6 μm high for example. Since the tips of the projections 21 and those of the partition walls 20 separating the neighboring ink transfer blocks 4 from each other are repellent, the ink 6 retained in the ink retainer 23 will not cover the tips of the projections 21 and those of the partition walls 20.

As described in the foregoing, the ink 6 used in the recording apparatus according to the present invention uses a dispersed dye or oil-soluble dye. So, the ink 6 has an absorbency per unit weight about 2 times larger than the ink containing an acidic dye or direct dye solved in water as solvent, used the conventional in-jet recording apparatus. Since the dye used in the ink 6 has a solubility of 10 to 25% by weight to a plasticizer as solvent, the ink 6 has a concentration 2 to 5 times larger than the ink used in the conventional ink-jet recording apparatus. Therefore, the ink 6 has a coloring property 4 to 10 times higher than the ink used in the conventional ink-jet recording apparatus.

That is to say, the recording apparatus according to the present invention can use a small amount of the above-mentioned ink 6 to implement a high-density transfer and also can totally be designed compact using the ink reservoir 7 of a smaller capacity. Also, the ink 6 can be used with a printing paper having a lower ink absorptivity, and thus with a larger variety of printing paper types.

More particularly, on the assumption that the usage of the ink for printing ordinary pictures is on the order of 30% and the ink reservoir has a capacity of 5 cc, the recording apparatus according to the present invention can print an image or the like, using the ink 6, in each of the yellow and magenta on 1500 or more sheets of the printing paper of A6 size (printing area: 110 mm×85 mm) and in cyan on 1000 or more sheets of the same printing paper.

(3) Printing paper

Next, the printing paper on which printing is made by the recording apparatus according to the present invention will be described below:

Any printing paper can be used with the recording apparatus according to the present invention in principle. More specifically, the printing paper includes a plain such as PPC and woodfree paper such as art paper. For printing an image having a high gradation and density, a dedicated paper should preferably be used with the recording apparatus according to the present invention. The dedicated paper is a one made by coating a base sheet with a resin which colors the dispersed dye or oil-soluble dye such as polyester, polycarbonate, acetate, CAB, polyvinyl chloride or the like.

For a higher-speed absorption of the ink 6, the printing paper should preferably have formed on the surface thereof many holes of 0.01 to 50 μm in size. For such a printing paper, two materials incompatible with each other, one being water-soluble while the other is not water-soluble, should be coated on the surface of the printing paper to form a structure in which noncrytalline and crystalline zones coexist with each other on the surface of the printing paper, and the printing paper surface be treated in water to remove the water-soluble material, thereby forming a porous structure. Also, the printing paper may have a porous structure formed on the surface thereof by adding a porous pigment such as silica, alumina or the like to the paper surface. If the mean size of many holes in the porous structure of the printing paper surface is near the wavelength of visible light, incident light is scattered on the printing paper surface which will thus have a reduced gloss. To avoid such problem, the porous structure should desirably be formed so that the many holes have a mean size of less than 0.1 μm.

For an improved storage stability of an image printed on the printing paper by the recording apparatus according to the present invention, the printing paper should desirably have a variety of additives added thereto. Lamination of a protective film such as resin film on the printing paper on which an image or the like is printed will also be effective for a higher storage stability of the printed image.

EXAMPLES

Nonlimitative examples of printing by the recording apparatus according to the present invention will be described below:

Example Nos. 1 and 2 and Comparative Example Nos. 1 and 2

The printer head constructed as shown in FIGS. 1 to 4 is used to print under conditions shown in Table 1. One pixel is formed from 256 voltage pulses given within 4 ms and pixels are continuously printed at a rate of 2 cm/s. Note that in each of the color inks, the dye concentration is 5% by weight.

TABLE 1

| | Ink | $T_b$ (° C.) | Power (mW) | v (K/s) | $(T_b\text{-}25)/v$ ($\mu$s) | $h^2/D$ ($\mu$s) |
|---|---|---|---|---|---|---|
| Example No. 1 | Solvent Blue-35/Dibutyl phthalate | 340 | 80 | $7.23 \times 10^5$ | 436 | 34.1 |
| Example No. 2 | Solvent Blue-35/Dibutyl phthalate | 340 | 240 | $24.1 \times 10^5$ | 145 | 34.1 |
| Comparative example No. 1 | Solvent Blue-35/Dibutyl phthalate | 340 | 2400 | $24.1 \times 10^4$ | 14.5 | 34.1 |
| Comparative example No. 2 | Solvent Blue-35/Toluene | 111 | 800 | $7.23 \times 10^4$ | 10.8 | 34.1 |

The properties of $SiO_2$ forming the projections in the ink transfer block and those of polysilicone forming the heater are shown in Table 2.

TABLE 2

| Material | Thermal conductivity (erg/cm · sK) | Specific heat × Density (erg/cm$^3$K) |
|---|---|---|
| $SiO_2$ | $1.35 \times 10^5$ | $1.843 \times 10^7$ |
| Poly-Si | 3.0 to $3.5 \times 10^6$ | $1.843 \times 10^7$ |

In these examples, the projections of $SiO_2$ formed in the ink transfer block are all 5 m high. The heat conductivity of $SiO_2$ is one size larger than that of the ink, so that the heat of the heaters provided on the bottoms of the ink transfer blocks is transferred to the ink surface mainly via the projections of $SiO_2$.

The time taken for the heat to transfer to the ink surface from the heaters provided on the bottoms of the ink transfer blocks can be calculated as follows:

$$h^2/D=(5\times10^{-4})^2\div(7.33\times10^{-3})=3.41\times10^{-5}\ (=3.41\ \mu s)$$

where $D=1.35\times10^5/1.843\times10^7=7.33\times10^{-3}$.

Each of the heater has a volume of $20\times20\times150$ ($\mu m^3$) and a heat capacity of $(20\times10^{-4})^2\times150\times10^{-4}\times1.843\times10^7=1.106$ (erg/K).

Evaluation of printed image:

The color density of each of printed images obtained as example Nos. 1 and 2 and comparative example Nos. 1 and 2 under the variety of printing conditions was measured using a Macbeth densitometer. Also, a microscope was used to measure the transferred dot diameter and check for satellite droplets. The test results are shown in Table 3.

TABLE 3

| | Density (OD) | Dot diameter ($\mu$m) | Satellite droplet |
|---|---|---|---|
| Example No. 1 | 2.1 | 34 | Not found |
| Example No. 2 | 1.9 | 41 | Not found |
| Comparative example No. 1 | 1.4 | 85 | Found |
| Comparative example No. 2 | 1.2 | 110 | Found |

As apparent from Table 3, in the comparative example Nos. 1 and 2 in which the time ($h^2/D$) taken from the heat to transfer from the heater surface to the ink surface is longer than the time $((T_b-T_i)/v))$ taken for the temperature of the ink on the heater to reach its boiling point, the printed dot diameters ere large and satellite droplets were also found, and the image density was low.

On the other hand, in the example Nos. 1 and 2 in which the time ($h^2/D$) is shorter than the time $((T_b-T_i)/v))$, the printed dot diameters were small, no satellite droplets were found, and the image density was high.

As seen from the test results shown above, a Marangoni convection can stably be developed based on the surface tension gradient, and printing can be done with a high transfer density, highly densely and at a high speed by setting the heating velocity of the heater so that the time taken for the heat to transfer from the heater to the ink surface is shorter than the time taken for the heater surface temperature to reach the ink boiling point.

The recording apparatus according to the present invention can stably develop a convection based on the surface tension gradient since the heating velocity is set for the heating means so that the time required for the heat to transfer from the heating means to the ink surface is shorter than the time required for the surface temperature of the heating means to each the ink boiling point.

Therefore, the recording apparatus according to the present invention is capable of printing with a high transfer density, highly stably and at a high speed.

The recording method according to the present invention permits to stably develop a convection based on the surface tension gradient since the heating velocity is set for the heating means so that the time required for the heat to transfer from the heating means to the ink surface is shorter than the time required for the surface temperature of the heating means to each the ink boiling point.

Therefore, the recording method according to the present invention permits to print with a high transfer density, highly stably and at a high speed.

What is claimed is:

1. A recording apparatus comprising:

an ink transfer block for retaining an ink;

a heating means for heating the ink retaining in the ink transfer block correspondingly to information to be printed, thereby developing a surface tension gradient and interfacial tension gradient on the ink surface, and a fluidity caused by the surface tension gradient and/or interfacial tension gradient of the ink surface is utilized to have the ink fly from the ink transfer block, thereby printing the information on a print receptor, whereby the heating means having a heating velocity v (in K/s) which meets the following:

$$(T_b-T_i)/v>h^2/D$$

where $T_b$: Boiling point of the ink in K $T_i$: Initial temperature of the ink in K h: Shortest distance between the surface of the heating means and ink surface in m D: Coefficient of thermal diffusion in $m^2/s$.

2. The apparatus as set forth in claim 1, wherein the ink transfer block comprises an ink retainer to retain the ink under the effect of capillarity.

3. The apparatus as set forth in claim 2, wherein the ink retainer is formed from a rugged structure having at least four projections of 1 to 50 μm in height, 1 to 10 μm in width and 2 to 40 μm in center distance.

4. A recording method comprising the steps of:

retaining an ink in an ink transfer block;

heating the ink in the ink transfer block correspondly to information to be printed, thereby developing a surface tension gradient and interfacial tension gradient on the ink surface, and a fluidity caused by the surface tension gradient and/or interfacial tension gradient of the ink surface is utilized to have the ink fly from the ink transfer block, thereby printing the information on a print receptor, whereby the heating means having a heating velocity v (in K/s) which meets the following:

$$(T_b - T_i)/v > h^2/D$$

where $T_b$: Boiling point of the ink in K $T_i$: Initial temperature of the ink in K h: Shortest distance between the surface of the heating means and ink surface in m D: Coefficient of thermal diffusion in $m^2/s$.

5. The method as set forth in claim 4, wherein the ink transfer block comprises an ink retainer to retain the ink under the effect of capillarity.

6. The method as set forth in claim 5, wherein the ink retainer is formed from a rugged structure having at least four projections of 1 to 50 μm in height, 1 to 10 μm in width and 2 to 40 μm in center distance.

* * * * *